(12) United States Patent
Van Blarkom

(10) Patent No.: US 6,360,324 B2
(45) Date of Patent: *Mar. 19, 2002

(54) SECURE DATABASE SYSTEM

(75) Inventor: Gilles Willem Van Blarkom, Krimpen aan den IJssel (NL)

(73) Assignee: International Computers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,117

(22) Filed: May 14, 1998

(30) Foreign Application Priority Data

Jun. 14, 1997 (GB) .............................. 9712459

(51) Int. Cl.$^7$ ................................. H04L 9/00
(52) U.S. Cl. ..................... 713/182; 713/161; 713/168
(58) Field of Search ................................ 707/514, 515, 707/9, 509; 705/3; 713/161, 168, 182

(56) References Cited

U.S. PATENT DOCUMENTS

| | | | | |
|---|---|---|---|---|
| 5,163,097 A | | 11/1992 | Pegg | 380/21 |
| 5,191,611 A | | 3/1993 | Lang | 380/25 |
| 5,606,610 A | * | 2/1997 | Johansson | 380/4 |
| 5,924,094 A | * | 7/1999 | Sutter | 707/10 |
| 5,956,400 A | * | 9/1999 | Chaum et al. | 380/4 |
| 5,987,440 A | * | 11/1999 | Oneil et al. | 705/44 |
| 6,029,160 A | * | 2/2000 | Cabrera et al. | 707/1 |

FOREIGN PATENT DOCUMENTS

WO  WO 95/15628  6/1995

OTHER PUBLICATIONS

Ahad, "HP OpenODB: An Object–Oriented Database Management System for Commercial Applications", Hewlett–Packard Journal, vol. 44, No. 3, Jun. 1993, pp. 20–30.

* cited by examiner

*Primary Examiner*—Thomas R. Peeso
(74) *Attorney, Agent, or Firm*—Lee, Mann, Smith, McWilliams, Sweeney & Ohlson

(57) ABSTRACT

A secure database system comprises a server having a database including at least one personal information table and at least one further table containing information relating to the persons whose details are stored in the personal information table. The keys of the tables in the database are unrelated, so that it is impossible to determine solely from information in the server which record in the further table corresponds to which record in the personal information table. Thus, even if a hacker obtains access to the database, the hacker will not be able to relate information in the different tables. Each legitimate client uses an encryption process to convert a personal identifier value, which identifies the record relating to a particular person in the personal information table, into a pseudo-identifier value, which identifies a record relating to the same person in the further table.

10 Claims, 2 Drawing Sheets

SECURE DATABASE SYSTEM

BACKGROUND TO THE INVENTION

This invention relates to secure databases.

Many countries have legislation for controlling the way in which personal data may be stored and used on computer systems. For example, the Dutch Personal Data Registration Act ("Wet Persoonsregistraties") demands (among other things) that the database must be secured against hackers who have succeeded in getting unauthorised access to the database despite all security applied to it. However, it has been found that conventional database systems do not satisfy this requirement. For example, in conventional hospital information systems, if a hacker gains access to a medical history record, the hacker can obtain the patient's key from this record and use this key to access any other records containing information about the same patient, such as the patient's name and address.

The object of the present invention is to provide a way of overcoming this problem.

SUMMARY OF THE INVENTION

According to the invention a computer system comprises:
(a) a server having a database including at least one personal information table and at least one further table containing information relating to persons whose details are stored in the personal information table; and
(b) a plurality of clients, for accessing said database;
(c) said tables in said database having keys that are unrelated to each other, whereby it is impossible to determine solely from information in the server which record in said further table corresponds to which record in said personal information table; and
(d) each client including an encryption process for converting a personal identifier value, which identifies a record relating to a particular person in said personal information table, into a pseudo-identifier value, which identifies a record relating to the same person in said further table.

It can be seen that, even if a hacker obtains access to the database, the hacker will not be able to relate information in the different tables. In a hospital information system for example, if a hacker obtains access to a medical history record, the hacker cannot relate this record to a particular patient.

DESCRIPTION OF AN EMBODIMENT OF THE INVENTION

One embodiment of the invention will now be described by way of example with reference to the accompanying drawings. This consists of a hospital records system which stores information about patients and their treatments, and which can only be accessed by authorised users, such as doctors, nurses and administrators. However, it will be appreciated that the invention can also be used in other applications where there is a need to protect personal data. For example, the invention could also be used in an insurance company database for storing personal data about customers and details about their claims.

Overall View of the System

Figure 1:
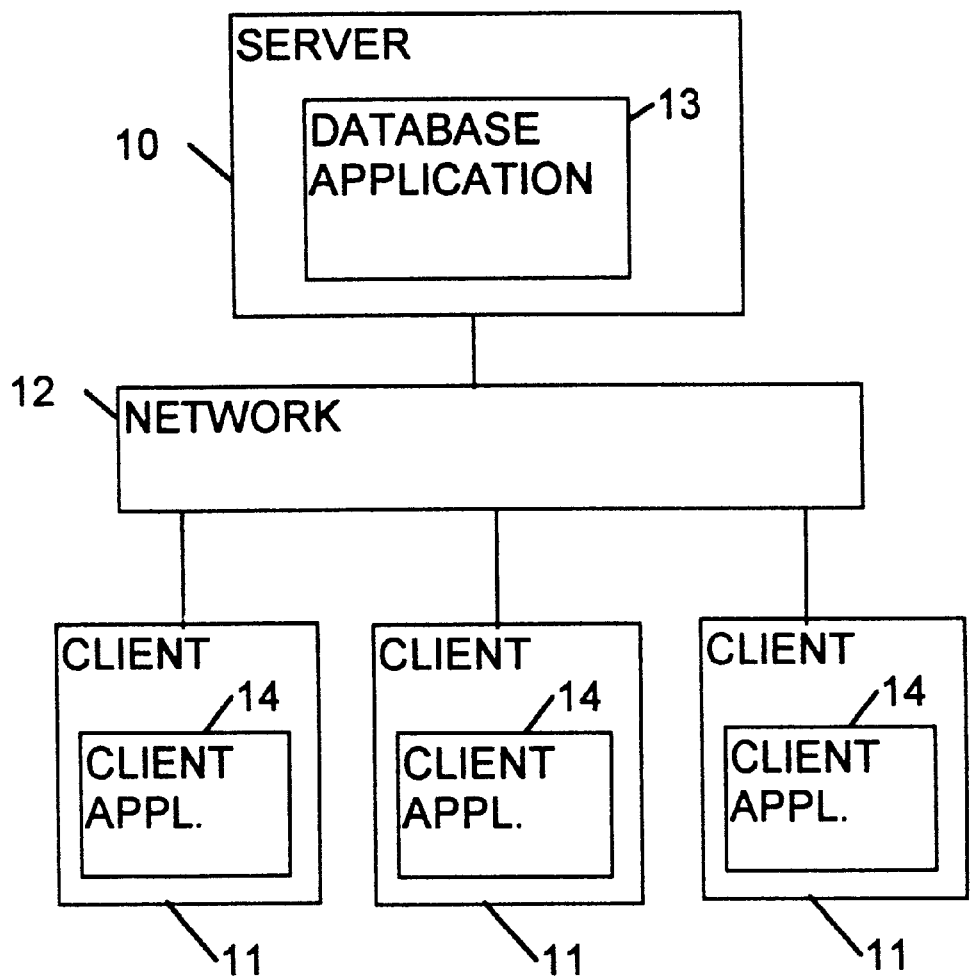
FIG. 1 is a block diagram showing a computer system incorporating a secure database.

Referring to FIG. 1, this shows a distributed computer system comprising a server 10 and a number of clients 11, interconnected by a network 12. The server is a central hospital computer, and the clients are personal computers (PCs), located on individual users' desks. The server 10 runs a database application 13, which may be any database system; for example, it may be an Oracle database. Each client 11 runs a client application 14, which enables an authorised user to communicate with the database, and to access data from it.

Figure 2:
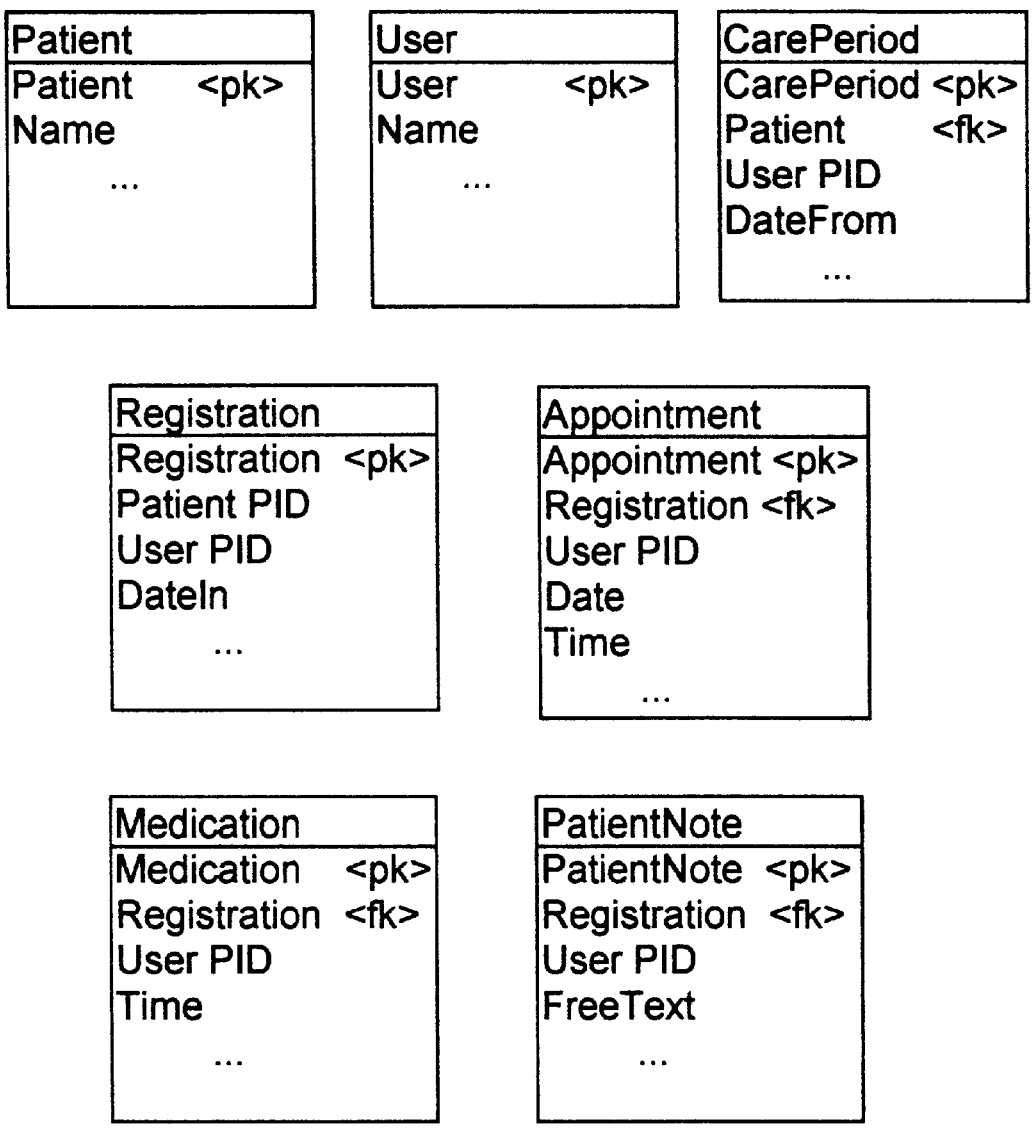
FIG. 2 shows a skeleton model of the database.

Referring to FIG. 2, the database 13 holds a number of tables. Each of these tables has a primary key (indicated by "pk"), which uniquely identifies each record in the table. This primary key is a numeric figure, starting with 1 (one) for the first record written in the table and incremented by 1 (one) for each subsequent record inserted into that table. Some of the tables also include foreign keys (indicated by "fk"), which identify connections between the tables.

There are two groups of tables. The first group contains personal data about patients and users, and the data defining the periods of care. Only the data in this group is required in order to establish if a user is allowed to access the records for a particular patient. This group comprises the following tables:

| | |
|---|---|
| Patient | Personal, non-medical data about individual patients, such as the patient's name, address and telephone number. |
| User | Information about authorized users of the system. The information includes such things as name, login name, and doctor's specialism. |
| Careperiod | Information about which users are currently responsible for the care of individual patients. |

The second group of tables holds medical data. It consists of a large number of tables, each of which holds one and only one group of facts. Some examples of tables in this second group are as follows:

| | |
|---|---|
| Registration | Information about registration of individual patients. There is one row in this table for each patient currently under active care. |
| Appointment | Information about appointments that have been arranged for individual patients. |
| Medication | Information about medication that has been prescribed for individual patients. |
| PatientNote | Free-text medical notes on individual patients. |

Each of the tables in this second group has a primary key which is in no way related to the primary keys of the patient or user. Therefore, even if a hacker manages to obtain access to one of these tables, it is not possible for the hacker to relate the medical data to a particular patient or user.

To enable authorised users to relate the information in this second group of tables to the patients or users, the system uses so-called pseudo-identifiers (PIDs). The PIDs are stored in extra columns of the tables. The PID values are calculated from the patients' and users' primary keys, using a cryptographic algorithm. The cryptographic algorithm is available only on the clients; the algorithm is not recorded in the database, and so cannot be discovered by a hacker who gains access to the server. The algorithm uses a master encryption key, which is different for each hospital.

The PID values are calculated using a different encryption protocol for each PID in each table. This is achieved by assigning a unique identifier number nr_PID to each PID in each table, and using this number as an input parameter for the cryptographic algorithm. In other words, the encryption algorithm for a particular PID uses the following three parameters:

the primary key being encrypted, the hospital's master encryption key, the unique identifier number nr_PID for the PID.

Thus, it is guaranteed that records relating to the same patient have different PID values in different tables, and records with the same PID in different tables do not relate to the same patient.

For example, in the database of FIG. 2, unique identifier numbers nr_PID may be assigned to the PIDs as follows:

| Table | PID | nr PID |
|---|---|---|
| Careperiod | User | 34 |
| Registration | Patient | 47 |
| Registration | User | 23 |
| Appointment | User | 127 |
| Medication | User | 18 |
| PatientNote | User | 5 |

Free-text columns in the database, such as in the PatientNote table, present a particular problem, since a user is free to put any text in these columns, and may therefore include the patient's name. This would be of great assistance to a hacker. This problem is overcome by storing such free text in encrypted form, using an encryption algorithm resident on the client.

Login

This section describes the operation of the system when a user logs in.

The client application first prompts the user to enter his or her login name and password, and sends a login message to the database application. When the database application receives this message, it authenticates the user. Techniques for authentication of users are well known, and so will not be described in any further detail.

Assuming that the user has been correctly authenticated, the database application then searches the User table, to find the record that matches the user's login name. From this record, the database application obtains the user's primary key.

The client application then encrypts the user's primary key, using the appropriate nr_PID (34 for example) as a parameter, to generate a user PID value for accessing the CarePeriod table. The PID is sent to the database application.

The database application then searches the CarePeriod table, to find all rows containing this PID. This identifies all the patients currently in the care of this particular user. The database application then uses the patient keys from these rows to access the corresponding rows of the Patient table. The patients' personal details are read from the Patient table, and are returned to the client application, where they are displayed to the user.

Medication Table

This section describes the operation of the system when a user wishes to obtain details of a particular patient's medication. It is assumed that the user has logged in to the system and has obtained the patient's primary key as described above.

The client application encrypts the patient's primary key, using the appropriate nr_PID (47 for example) as a parameter, so as to generate a patient PID value for accessing the Registration table. The patient PID is sent to the database application.

The database application searches the Registration table to find the row that contains this patient PID value. It then uses the Registration key from this row to access the corresponding row in the Medication table. The medication record of the patient is then read from this row, and is returned to the client application, for displaying to the user.

Appointment Table

This section describes the operation of the system when a user wishes to obtain details of a patient's appointments with a particular doctor. It is assumed that the user has logged in to the system and has obtained the patient's primary key as described above.

The user primary key for the doctor is first read from a look-up table into the client application.

The client application then encrypts the patient primary key, using the appropriate nr_PID (47 for example) as a parameter, so as to generate a patient PID value for accessing the Registration table. The client application also encrypts the user primary key, using the appropriate nr_PID (23 for example) as a parameter, so as to generate a user PID value for accessing the Registration table. The calculated PID values are sent to the database application.

The database application then searches the Registration table, to find a row containing both of these PID values. It then uses the Registration primary key from this row to access the corresponding row in the Appointments table. Details of the appointment are then read from this row, and returned to the client application, for displaying to the user.

PatientNote Table

This section describes the operation of the system when a user wishes to view a free-text note relating to a particular patient. It is assumed that the user has logged in to the system and has obtained the patient's primary key as described above.

The client application first encrypts the patient primary key, using the appropriate nr_PID (47 for example) as a parameter, so as to generate a patient PID value for accessing the Registration table. The PID is sent to the database application.

The database application then searches the Registration table, to find the row that contains this patient PID value. It then uses the Registration primary key from this row to access the corresponding row in the PatientNote table. This row contains the (encrypted) free-form text notes relating to the patient, and is returned to the client application. The client application then decrypts the notes, and displays them to the user.

The user can also update the text, or create new text, using a conventional word processor. The client application encrypts this text, and sends it to the database application, for writing into the PatientNote table.

Network Encryption

Preferably, all traffic over the network 12 is encrypted, to protect it against eavesdropping. It should be noted that this encryption is additional to the encryption processes described above. Encryption techniques for networks are well known, and so will not be described in any further detail in this specification.

Some Possible Modifications

It will be appreciated that many modifications may be made to the system described above without departing from the scope of the present invention. For example, instead of using the same encryption algorithm for all the tables, a different encryption algorithm may be used for each table.

The login procedure may be enhanced with some sort of software for user authentication. This process will involve an extra database server. It is envisaged that the authentication process will, on a positive authentication, return the encryption key or keys to be used by the client application to calculate the required PIDs.

What is claimed is:

1. A computer system comprising:
   (a) a server computer including a database;
   (b) a plurality of client computers;
   (c) a network connecting said client computers to said server computer;
   (d) said database including at least one personal information table holding personal records containing information relating to a plurality of persons, each person being identified in said personal information table by a unique personal identifier value;
   (e) said database also including a plurality of further tables, each of said further tables holding records containing further information relating to said persons, and each of said further tables having an encryption parameter associated therewith, said encryption parameter being different for each of said further tables;
   (f) each of said client computers including encryption means for encrypting a personal identifier value using the encryption parameter of a selected one of said further tables, to generate an encrypted identifier value and means for sending the encrypted identifier value over said network to said server computer; and
   (g) said server computer including access means for using said encrypted identifier value to access a record in the selected one of said further tables.

2. A computer system according to claim 1 wherein each of said further tables includes a column for storing pseudo-identifier values, and wherein said access means comprises means for searching the selected one of said further tables to find a record whose pseudo-identifier value matches said encrypted identifier value.

3. A computer system according to claim 1 wherein said encryption means uses a master encryption key, in combination with said encryption parameter, to encrypt said personal identifier value.

4. A computer system according to claim 1 wherein the database includes at least one free text table containing free text information, and wherein each of said client computers includes means for encrypting text before writing it into said free text table and for decrypting text when read from said free text table.

5. A computer system according to claim 1 including means for encrypting information while in transit between said client computers and said server computer.

6. A method of securely storing data in a database, the method comprising:
   (a) storing a database in a server computer;
   (b) said database including at least one personal information table holding personal records containing information relating to a plurality of persons, each person being identified in said personal information table by a unique personal identifier value;
   (c) said database also including a plurality of further tables, each of said further tables holding records containing further information relating to said persons, and each of said further tables having an encryption parameter associated therewith, said encryption parameter being different for each of said further tables;
   (d) in a client computer, encrypting a personal identifier value using the encryption parameter of a selected one of said further tables, to generate an encrypted identifier value, and sending the encrypted identifier value over a network to the server computer; and
   (e) in said server computer, using said encrypted identifier value to access a record in the selected one of said further tables.

7. A method according to claim 6 wherein each of said further tables includes a column for storing pseudo-identifier values, the method including searching the selected one of said further tables to find a record whose pseudo-identifier value matches said encrypted identifier value.

8. A method according to claim 6 wherein the step of encrypting a personal identifier value comprises using a master encryption key, in combination with said encryption parameter.

9. A method according to claim 6 including storing in said database at least one free text table containing free text information, encrypting text before writing it into said free text table and decrypting text when read from said free text table.

10. A method according to claim 6 including encrypting information while in transit between said client computer and said server computer.

* * * * *